United States Patent
Sanciangco et al.

(10) Patent No.: US 11,233,779 B2
(45) Date of Patent: Jan. 25, 2022

(54) WIRELESS CREDENTIAL SHARING

(71) Applicant: Apple Inc., Cupertino, CA (US)

(72) Inventors: Alexander D. Sanciangco, San Jose, CA (US); Maureen G. Daum, Mountain View, CA (US); Richard J. Mondello, Mountain View, CA (US); Reza Abbasian, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 16/147,688

(22) Filed: Sep. 29, 2018

(65) Prior Publication Data

US 2019/0372949 A1  Dec. 5, 2019

Related U.S. Application Data

(60) Provisional application No. 62/679,902, filed on Jun. 3, 2018.

(51) Int. Cl.
*H04L 29/06* (2006.01)
*H04W 12/06* (2021.01)
(Continued)

(52) U.S. Cl.
CPC ............ *H04L 63/062* (2013.01); *G06F 21/45* (2013.01); *H04L 63/08* (2013.01); *H04W 12/04* (2013.01);
(Continued)

(58) Field of Classification Search
CPC ......... H04L 63/062; H04L 63/08; H04L 9/30; H04L 9/14; H04L 2209/80; H04L 9/0841;
(Continued)

(56) References Cited

U.S. PATENT DOCUMENTS 8,775,757 B2  7/2014  Polzin et al.
8,832,465 B2  9/2014  Gulati et al.
(Continued)

OTHER PUBLICATIONS

Face ID Security, Apple Inc., Nov. 2017, 6 pages.
OS Security Guide—White Paper, iOS 11, Apple Inc., Jan. 2018, 82 pages.

*Primary Examiner* — Cheng-Feng Huang
(74) *Attorney, Agent, or Firm* — Kowert, Hood, Munyon, Rankin & Goetzel, P.C.

(57) ABSTRACT

Techniques are disclosed relating to credential sharing for user authentication. In some embodiments, a first computing device maintains a credential manager that stores a plurality of user credentials usable to authenticate a user. The first computing device receives a request from the user to send one of the plurality of user credentials to a second computing device. In response to the request, the first computing device sends the user credential to the second computing device. The second computing device is configured to determine whether an application of the second computing device is presenting an authentication prompt to a user and, in response to determining that the authentication prompt is being presented, populate one or more fields of the authentication prompt with the user credential. In some embodiments, the second computing device is configured to store the user credential in a credential manager maintained by the second computing device.

19 Claims, 8 Drawing Sheets

(51) Int. Cl.
  *H04W 12/04* (2021.01)
  *H04W 76/10* (2018.01)
  *G06F 21/45* (2013.01)
  *H04L 9/30* (2006.01)

(52) U.S. Cl.
  CPC ............ *H04W 12/06* (2013.01); *H04W 76/10* (2018.02); *H04L 9/30* (2013.01)

(58) Field of Classification Search
  CPC ....... G06F 21/45; H04W 76/10; H04W 12/04; H04W 12/06; H04W 12/0608
  See application file for complete search history.

(56) References Cited

U.S. PATENT DOCUMENTS

| | | | |
|---|---|---|---|
| 8,873,758 B2 | 10/2014 | Bradley | |
| 9,547,778 B1 | 1/2017 | Paaske et al. | |
| 2002/0031230 A1* | 3/2002 | Sweet | H04L 63/102 380/278 |
| 2007/0209066 A1* | 9/2007 | Timmerman | G06F 21/41 726/6 |
| 2008/0034411 A1* | 2/2008 | Aoyama | H04L 63/0861 726/5 |
| 2013/0138570 A1* | 5/2013 | Ross | G06Q 20/3821 705/67 |
| 2014/0020070 A1* | 1/2014 | Angal | H04L 63/12 726/5 |
| 2014/0059672 A1* | 2/2014 | Natividad | G06F 21/31 726/18 |
| 2014/0176436 A1* | 6/2014 | Raffa | G06F 3/017 345/158 |
| 2014/0189808 A1* | 7/2014 | Mahaffey | H04L 63/083 726/4 |
| 2015/0220734 A1* | 8/2015 | Nalluri | G06F 21/6218 726/23 |
| 2015/0278504 A1* | 10/2015 | Azim | H04W 12/065 726/3 |
| 2015/0347725 A1* | 12/2015 | Ben Ari | G06F 21/31 726/19 |
| 2017/0373843 A1 | 12/2017 | Benson et al. | |
| 2018/0083959 A1* | 3/2018 | Barbosa | H04L 9/3228 |
| 2018/0176223 A1* | 6/2018 | Hutchinson | H04L 63/10 |

* cited by examiner

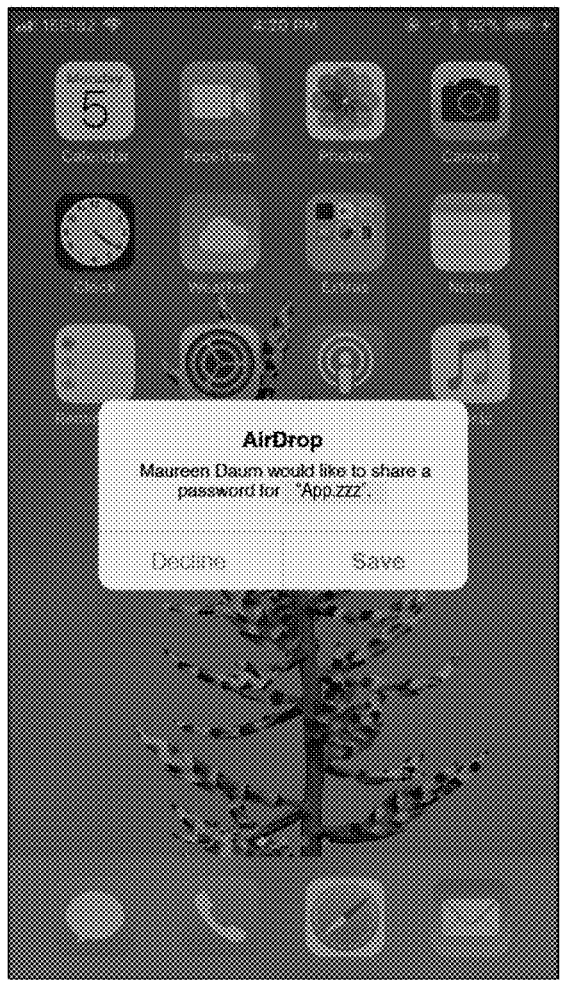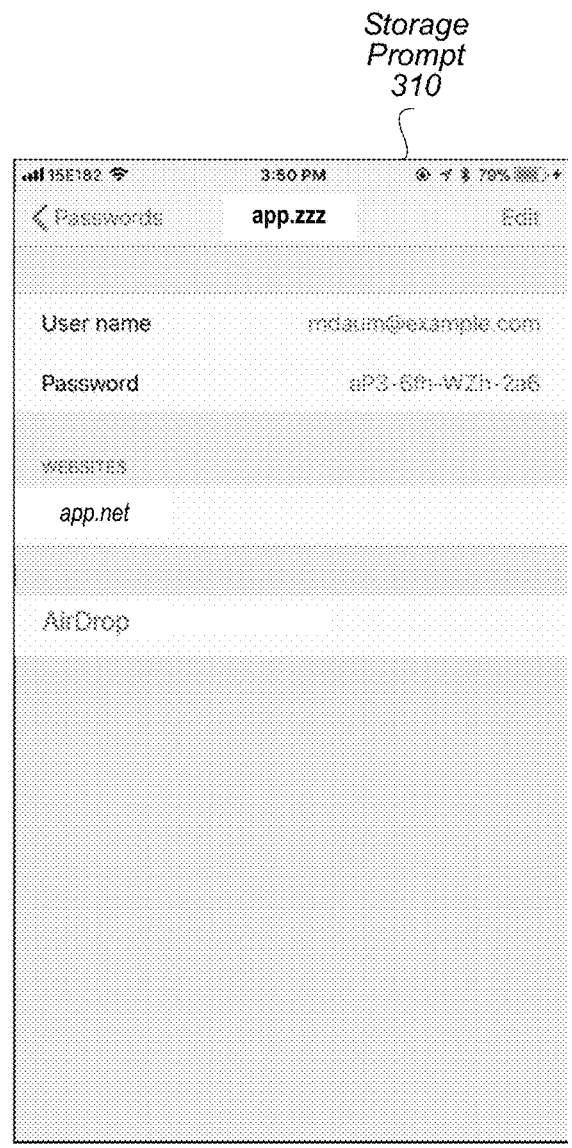
FIG. 3D

400

```
┌─────────────────────────┐
│ Receive User Credential from│
│ Credential Manager Maintained│
│ by Second Computing Device │
│            405             │
└─────────────────────────┘
            │
            ▼
┌─────────────────────────┐
│ Determine Whether Application│
│ of First Computing Device is │
│  Presenting Authentication   │
│       Prompt to User         │
│            410             │
└─────────────────────────┘
            │
            ▼
┌─────────────────────────┐
│ In Response, Populate Fields │
│  of Authentication Prompt    │
│    with User Credential      │
│            415             │
└─────────────────────────┘
```

```
┌─────────────────────────┐
│ Maintain Credential Manager │
│   Storing User Credentials  │
│ Usable to Authenticate User │
│            435             │
└─────────────────────────┘
            │
            ▼
┌─────────────────────────┐
│ Receive Request from User to│
│ Send User credential to Second│
│      Computing Device        │
│            440             │
└─────────────────────────┘
            │
            ▼
┌─────────────────────────┐
│  In Response, Send User     │
│   Credential to Second       │
│      Computing Device        │
│            445             │
└─────────────────────────┘
```

FIG. 4B

WIRELESS CREDENTIAL SHARING

The present application claims priority to U.S. Prov. Appl. No. 62/679,902, filed Jun. 3, 2018, which is incorporated by reference herein in its entirety.

BACKGROUND

Technical Field

This disclosure relates generally to computing devices, and, more specifically, to user authentication.

Description of the Related Art

Many online services typically ask a user to create a credential, such as a username and password, when registering with a service in order to facilitate a subsequent user authentication. A user may be tempted to use a short password or reuse the same password across services because it is easier to remember the password. These practices, however, can make it easier to compromise a password and gain access to multiple accounts of a user. To discourage this behavior, a computing device may offer to maintain a user's passwords. For example, many modern web browsers may detect when a user has entered a password into a webpage and offer to store it for use in a subsequent authentication with the webpage.

BRIEF DESCRIPTION OF THE DRAWINGS

FIGS. 3A-D illustrate various examples of prompts presented to users sharing a credential between devices.

FIGS. 4A and 4B are a flow diagrams illustrating exemplary methods for sharing credentials.

Figure 1:
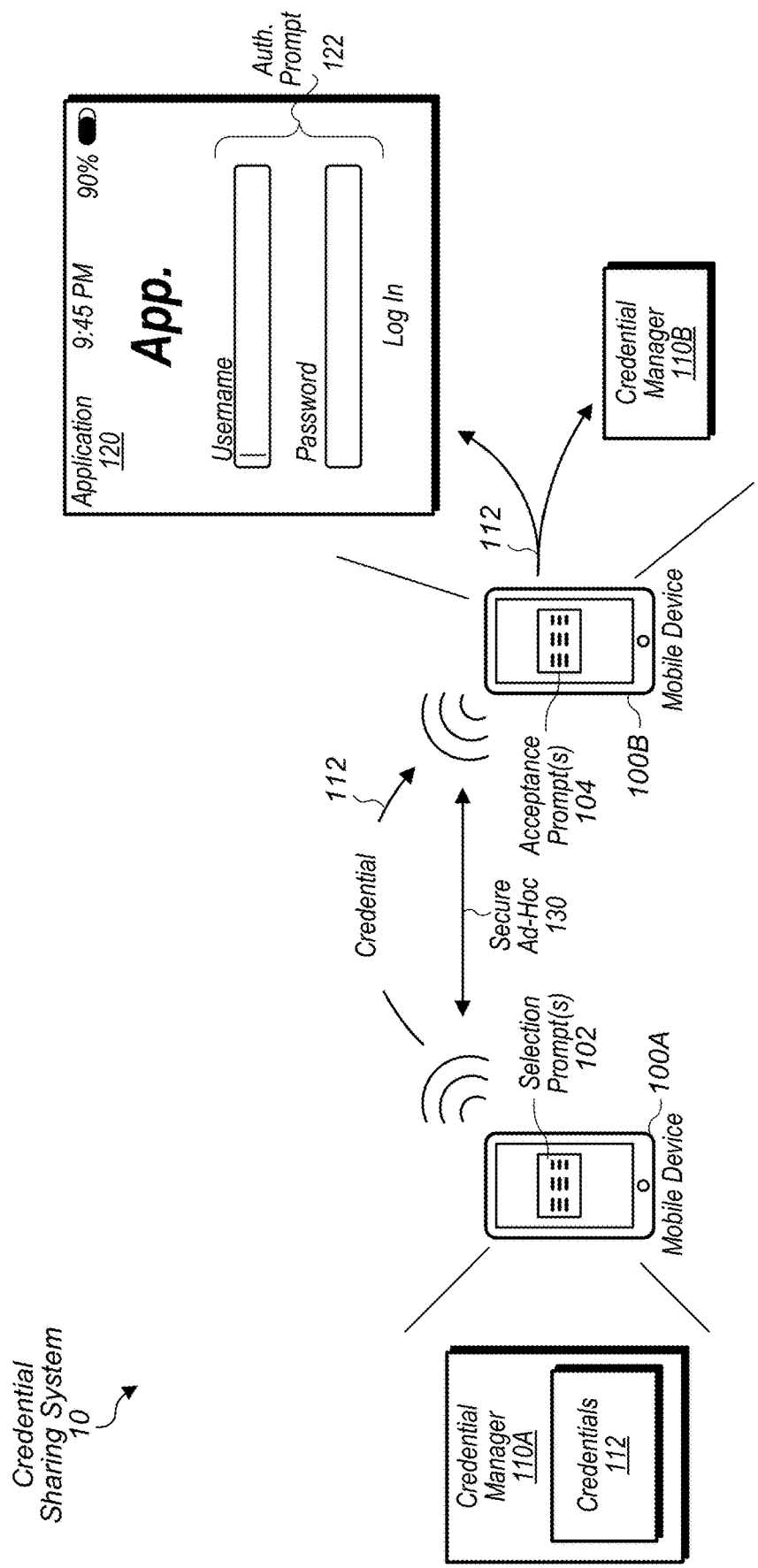
FIG. 1 is a block diagram illustrating an example of a system for sharing credentials between devices.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing device configured to present a prompt on display" is intended to cover a device, for example, that has display pipeline circuitry and/or memory having program instructions executable by a processor to perform this function during operation, even if the device in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first credential and a second credential. The term "first" is not limited to the initial credential of the device. Accordingly, the term "first" may be used to refer to any credential on the device.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a user may have one or more authentication credentials stored on a first computing device and want to share a credential with a second computing device, which may be attempting to authenticate a user. As will be described in greater detail below in various embodiments, a first computing device can maintain a credential manager that stores a plurality of user credentials usable to authenticate a user. In response to receiving a request from a user, the first computing device can send a user credential to the second computing device, which is configured to determine whether any applications of the second computing device are presenting an authentication prompt to a user. If an application is presenting an authentication prompt, the second computing device can automatically populate one or more fields of the authentication prompt with the user credential. In some embodiments, if no application is presenting an authentication prompt, the second computing device is configured to store the user credential in a credential manager maintained by the second computing device.

Turning now to FIG. 1, a block diagram of a credential sharing system 10 is depicted. In the illustrated embodiment, system 10 includes mobile devices 100A and 100B, which include respective credential managers 110A and 110B. Mobile device 100B also includes an application 120 attempting to authenticate a user. In some embodiments, system 10 may be implemented differently than shown. For example, mobile device 100 may correspond to any suitable device such as those discussed below with respect to FIG. 5. Although shown as communicating a credential wirelessly, a wired connection may also be used.

Credential manager 110A, in various embodiments is an application executable to store various credentials 112 at mobile device 100A. These credentials 112 may include any suitable type of credential such as a username and password, one-time password (OTP), personal identification number (PIN), a cryptographic key for generating a digital signature, authentication token, etc. In some embodiments, credential manager 110A may be integrated into another application such as an operating system, a web browser, etc. In various embodiments, manager 110A protects credentials 112 using one or more cryptographic keys, which may be derived based on authentication information provided by the user to unlock manager 110A. As such, manager 110A may request a user authentication prior to providing a protected credential 112 for use with respect to an authentication prompt.

Application 120, in various embodiments, is an application executable to present an authentication prompt 122 soliciting a credential 112 for authenticating a user with respect to a service. This service may pertain to, for example, accessing content maintained by application 120, enabling functionality of application 120, logging into application 120, etc. This service may also pertain to accessing information located externally from device 100B. For example, application 120 may be an application associated with a streaming service and executable to stream various video content to device 100B. In some embodiments, application 120 is a web browser executable to render webpages on a display of device 100B—thus, authentication prompt 122 may correspond to an authentication page for a website. In some embodiments, application 120 is a web application downloaded and presented by a web browser of computing device 100B. In FIG. 1, authentication prompt 122 solicits a username and password; however, prompt may solicit any suitable credential such as those discussed above. In some embodiments, prompt 122 may request two or more credentials 112. In other embodiments, application 120 may solicit credentials 112 in a manner that does not include presenting an authentication prompt 122.

As discussed above, in various embodiments, mobile device 100A is configured to share a credential 112 maintained by credential manager 110A with mobile device 100B. In some embodiments, credential sharing may employ a push model in which device 100A initiates the sharing in response to, for example, a user of device 100A making a request via selection prompt 102 to send a credential 112. In some embodiments, credential sharing may employ a pull model in which device 100B initiates the sharing in response to, for example, a user request at device 100B or determining that application 120 is presenting an authentication prompt 122. In some embodiments, mobile device 100A also sends metadata usable by mobile device 100B to determine whether a shared user credential 112 is relevant to a particular authentication prompt 122. For example, if a prompt 122 is being presented to authenticate for a service associated with a website, this metadata may identify the particular website by specifying, for example, a domain, a uniform resource locator (URL), internet protocol (IP) address, etc. This metadata may also identify the particular application 120 by specifying, for example, the name of the application, the name of application's executable file, the directory path to the executable file, etc. This metadata may also identify the type of credential 112 such as those noted above. In some embodiments, mobile device 100B may send similar metadata about authentication prompt 122 in order to enable device 100A to determine whether credential manager 110A includes a credential 112 relevant to prompt 122 and identify the credential 112 to a user such as via a selection prompt 102.

In various embodiments, mobile devices 100 are configured to establish a secure connection 130 prior to a credential 112 being conveyed. As will be described in greater detail below with respect to FIG. 2, this may include devices 100 exchanging one or more cryptographic keys used to encrypt traffic sent via connection 130 including credential 112. In the illustrated embodiment, connection 130 is also an ad-hoc connection between devices 100A and 100B. As used herein, the term "ad-hoc connection" is to be interpreted in accordance with its understood meaning, which includes a peer-to-peer connection that does not rely on any intermediary devices (such as switches, wireless access points, etc.) between the sender and recipient. In other embodiments, connection 130 may not be an ad-hoc connection. Connection 130 may also use any suitable communication technology such as Bluetooth™, Wi-Fi™, cellular, or combination thereof.

Based on a user of device 100A selecting a credential 112 to share with device 100B, in various embodiments, mobile 100B may determine whether application 120 is presenting an authentication prompt 122, which can potentially use the credential 112. In some embodiments, this determination further includes mobile device 100B using metadata received from mobile device 100A to determine whether the shared credential 112 is relevant to authentication prompt 122. If authentication prompt 122 is being presented, device 100B may present an acceptance prompt 104 asking a user of device 100B if he or she wants to accept the credential 112. If the user answers affirmatively, mobile device 100B may automatically populate one or more fields in the authentication prompt 122 with the credential 112. In some embodiments, device 100B may further automatically submit content of the populated one or more fields to cause performance of the authentication. In other embodiments, however, a user may be required to select, for example, a button on prompt 122 to submit a credential 112. In some embodiments, if no authentication prompt 122 is being presented, mobile device 100B may present a prompt 104 asking the user if he or she would like to store the credential 112 at device 100B. If the user answers affirmatively, device 100B may provide the credential 112 to credential manager 110B for storage, which may be implemented in a similar manner as credential manager 110A discussed above. An exemplary exchange between devices 100A and 100B will now be discussed below with respect to FIG. 2.

Figure 2:
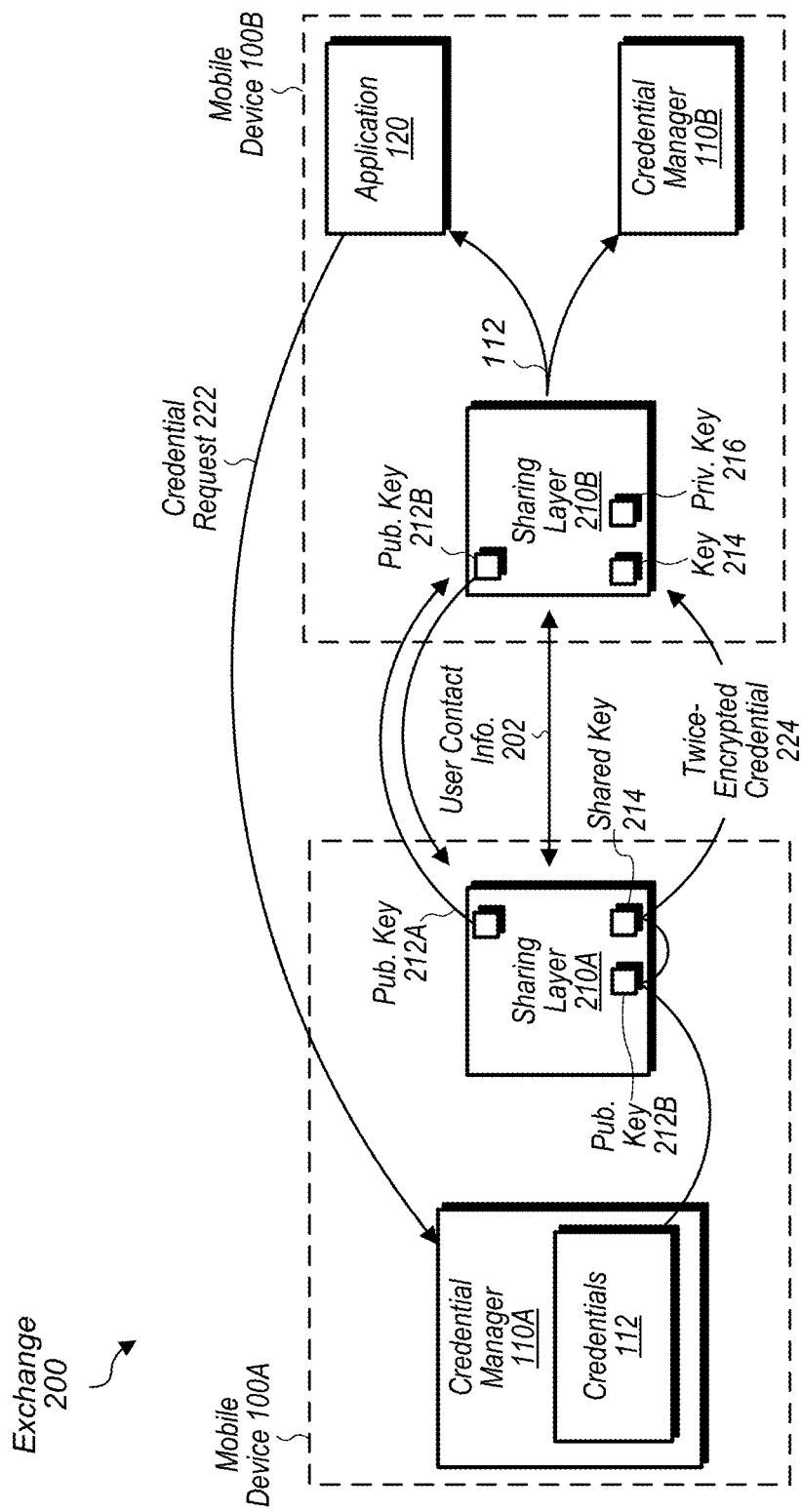
FIG. 2 is a communication diagram illustrating an example of an exchange between devices sharing credentials.

Turning now to FIG. 2, a block diagram of an exchange 200 for sharing a credential 112 is depicted. In the illustrated embodiment, mobile device 100A includes a sharing layer 210A along with credential manager 110A. Mobile device 100B includes a sharing layer 210B along with application 120 and credential manager 110B. In some embodiments, exchange 200 may be implemented differently than shown.

Sharing layers 210, in various embodiments, are processes executable to facilitate communication of items between mobile devices 100A and 100B. Accordingly, layers 210 may interface with network interface drivers controlling radios of mobile devices 100 and may implement one or more network stack/open systems interconnection (OSI) model layers. For example, as will be discussed below, layers 210 may establish secure connection 130.

In various embodiments, sharing layers 210A and 210B may initially exchange contract information 202 about the users of their respective devices in order to determine potential neighboring devices that may want to participate in exchange 200. Accordingly, if a user of mobile device 100A requests to share an item (such as a credential 112) with a neighboring device (such as mobile device 100B), sharing layer 210A may request contact information 202 from neighboring devices and advertise only the devices for which device 100A already stores the contract information 202. For example, if device 100A maintains contact information for a friend belonging to a user of device 100A, device 100A may compare received contact information 202 from mobile device 100B with the maintained contact information in order to determine whether device 100B belongs to the friend. If the information matches, device 100A may present device 100B as a neighboring device to potentially establish a connection 130. Similarly, if a user of mobile device 100B requests to receive an item (such as a credential 112) from a neighboring device, layer 210B may solicit contact information from mobile device 100A and advertise it if it matches contact information already stored in mobile device 100B.

In response to a user selecting a mobile device 100 for sharing a credential 112, sharing layers 210A and 210B may establish a secure connection 130 between mobile devices 100A and 100B to facilitate exchange 200. In various embodiments, this may include layers 210 exchanging respective public keys 212A and 212B of devices 100A and 100B in order to establish a shared cryptograph key 214 based on the exchanged public keys 212 and their corresponding private keys. In some embodiments, layers 210 may specifically establish a transport layer security (TLS) session including deriving a shared key 214 using elliptic-curve Diffie-Hellman (ECDH) to perform encryption using advanced encryption standard (AES).

In the illustrated embodiment, sharing layer 210A is executable to twice encrypt a credential 112 being sent via connection 130. In particular, layer 210A may initially encrypt a credential 112 received from manager 110A with the received public key 212B from mobile device 100B. Layer 210A may then further encrypt the encrypted credential 112 with the shared key 214 to produce twice-encrypted credential 224. Similarly, layer 210B may then decrypt credential 224 by initially decrypting credential 224 with the shared key 214 and then again decrypting credential with private key 216 corresponding to public key 212B. In some embodiments, layer 210A performs the initial encryption with public key 212B (and thus the twice encryption) so that layer 210 does not maintain an unencrypted copy of credential 112 while it establishes shared key 214 and communicates with other network stack layers to facilitate exchange 200. Thus, if layer 210's execution is interrupted, another process may be prevented from obtaining an unencrypted version of credential 112 by accessing locations in volatile and/or non-volatile memory where layer 210 is maintain its data. In other embodiments, however, a shared credential 112 may be encrypted differently—e.g., it may be encrypted with merely shared key 214, manager 110A may perform encryption with public key 212A, etc.

Once a secure connection 130 has been established in the illustrated embodiment, application 120 may convey, to credential manager 110A, a credential request 222, which may include metadata used by manager 110A to identify a relevant credential 112 as discussed above with respect to FIG. 1. Credential manager 110A may then present a prompt 102 asking the user if he or she would like to share that credential 112. In some embodiments, mobile device 100A also performs a local authentication of the user before permitting a credential 112 to be sent to mobile device 100B. Such an authentication may include verifying a user's biometric (e.g., fingerprint, facial data, etc.), passcode, etc. After credential 112 has been successfully received by mobile device 100B and decrypted, mobile device 100B may then distribute credential 112 to application 120 or credential manager 110B as discussed above.

Various examples of prompts 102 and/or 104, which may be presented on devices 100 during exchange 200, will now be discussed with respect to FIGS. 3A-3D.

Figure 3A:
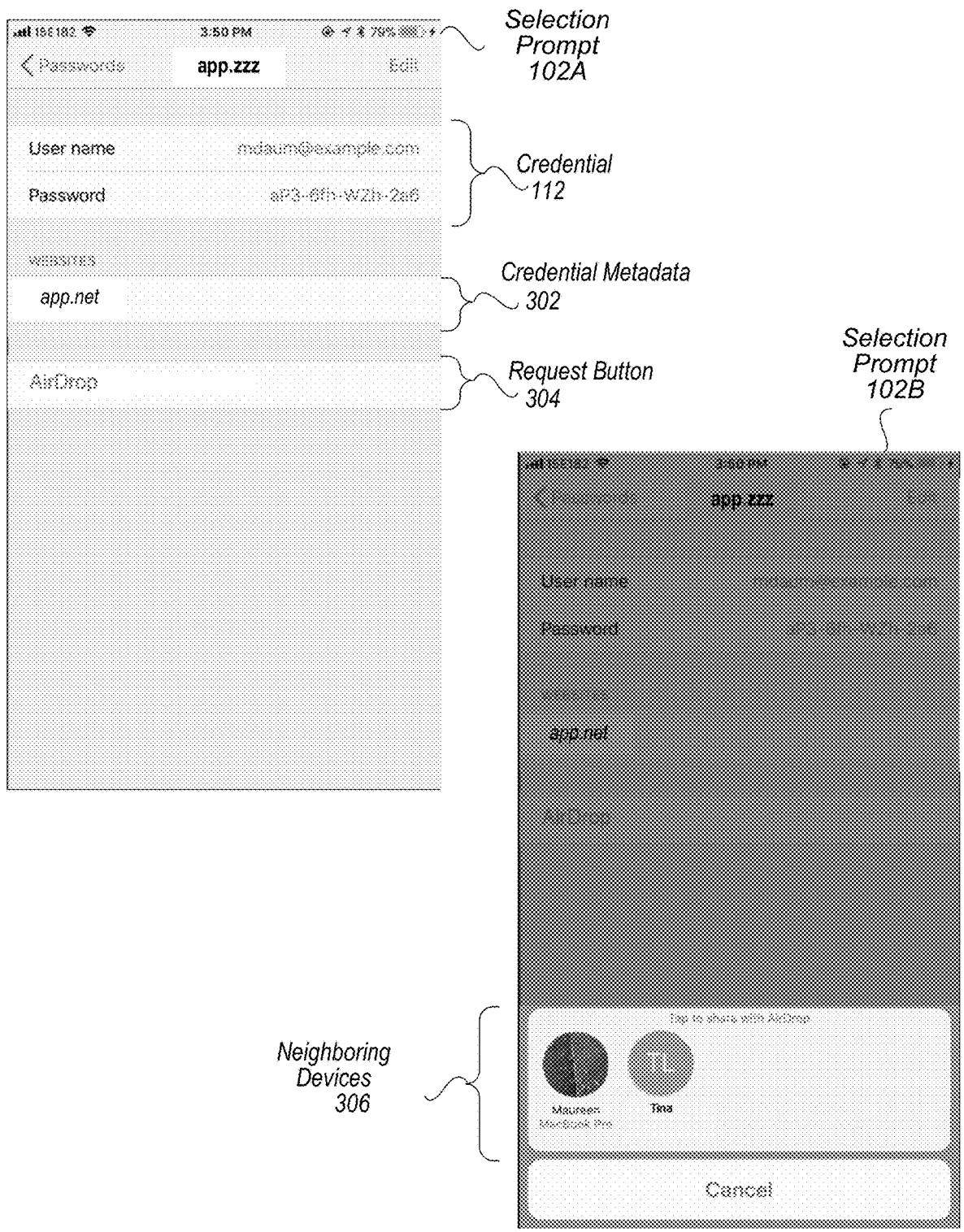

Turning now to FIG. 3A, an example of two selections prompts 102A and 102B are depicted. In the illustrated embodiment, credential manager 110A may initially present selection prompt 102A depicting the contents of credential 112 as well as any metadata 302 about the credential 112 to the user. If the user wants to share this credential 112, the user may submit a request by selecting request button 304. In the illustrated embodiment, upon selection of button 304, a list of neighboring devices 306 may be presented to the user so that the user can select one for sharing a credential 112. As noted above, these devices 306 may be identified based on exchanged contact information 202. For example, as shown, "Maureen" may be the owner of mobile device 100B and have her contact information stored in mobile device 100A. Thus, Maureen's laptop may be advertised in prompt 102B in response to the laptop conveying information 202 that matches information stored on mobile device 100A. In some embodiments, prompts 102A and 102BA may be implemented differently than shown.

Figure 3B:
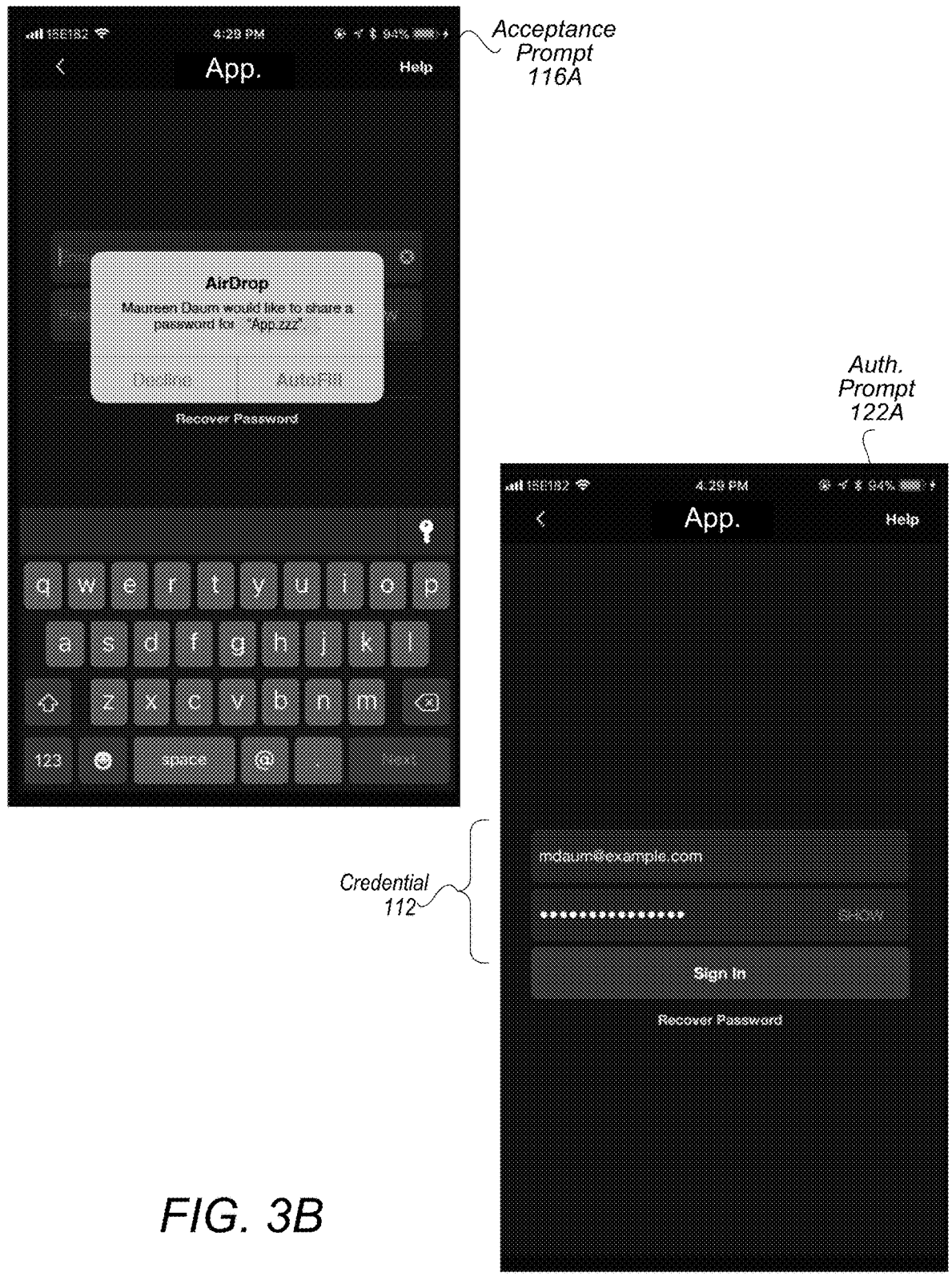

Turning now to FIG. 3B, an example of an acceptance prompt 116A and an authentication prompt 122A is depicted. As noted above, in various embodiments, application 120 may present an application authentication prompt 122A. Accordingly, in the illustrated embodiment, mobile device 110B has determined that an application prompt 122A is being presented and displays an acceptance prompt 116A asking the user if he or she would like to autofill the application's prompt 122A. In response to the user confirming the autofill, mobile device 100B may automatically insert the credential 112 into fields of the prompt 122A—e.g., the email and passwords fields in the illustrated embodiment. In some embodiments, prompts 116A and 122A may be implemented differently than shown.

Figure 3C:
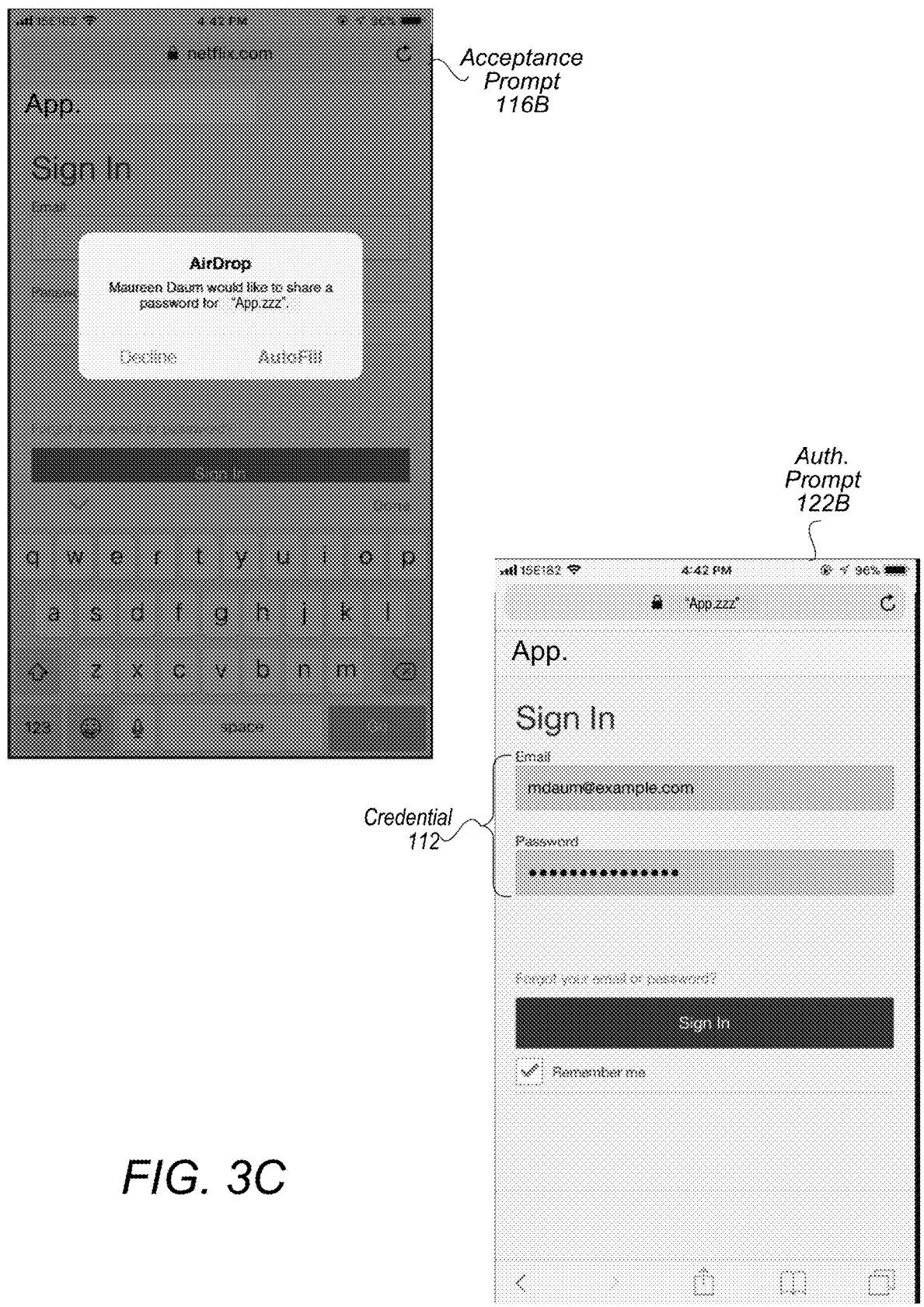

Turning now to FIG. 3C, another example of an acceptance prompt 116B and an authentication prompt 122B is depicted. As noted above, in various embodiments, application 120 may present a webpage authentication prompt 122B. Accordingly, in the illustrated embodiment, mobile device 110B has determined that a webpage prompt 122B is being presented and displays an acceptance prompt 116B asking the user if he or she would like to autofill the prompt 122B. In response to the user confirming the autofill, mobile device 100B may automatically insert the credential 112 into fields of the prompt 122B—e.g., the email and passwords fields in the illustrated embodiment. In some embodiments, prompts 116B and 122B may be implemented differently than shown.

Turning now to FIG. 3D, an example of an acceptance prompt 116C and a storage prompt 310 is depicted. As noted above, in various embodiments, if mobile device 100B is unable to detect an authentication prompt 122, mobile device 100B may still offer to store the received credential 112 in credential manager 110B. Accordingly, in the illustrated embodiment, an acceptance prompt 116C is presented in which the user is asked if he or she would like to save a credential 112. In response to the user responding affirmatively, credential manager 110B may present a storage prompt 310 showing the storage of the credential 112 by manager 110B. In some embodiments, prompts 116C and 310 may be implemented differently than shown.

Turning now to FIG. 4A, a flow diagram of a method 400 for sharing a credential is depicted. In some embodiments, method 400 is performed by a first computing device, such as mobile device 100B, receiving a credential from a second computing device. In some embodiments, steps may be performed concurrently or in a different order than shown.

In step 405, a first computing device receives a user credential (e.g., credential 112) from a credential manager (e.g., credential manager 110A) maintained by a second computing device (e.g., mobile device 100A). In various embodiments, the first computing device receives, from the second computing device, a request (e.g., via request button 304) to convey the user credential to the first computing device and establishes a secure wireless connection (e.g., connection 130) with the second computing device to receive the user credential. In some embodiments, the secure wireless connection is an ad-hoc wireless connection. In some embodiments, the first computing device sends a public key (e.g., public key 212B) of the first computing device to the second computing device and establishing a shared key (e.g., shared key 214) with the second computing device based on a public key (e.g., public key 212A) received from the second computing device and a private key (e.g., private key 216) corresponding to the sent public key. In some embodiments, the received user credential (e.g., twice-encrypted credential 224) is encrypted by the public key of the first computing device and encrypted by the shared key. In some embodiments, the first computing device sends, to the second computing device, contact information (e.g., contact information 202) about a user of the first computing device, and the second computing device is configured to determine whether to establish the secure wireless connection based on a comparison of the contact information with contact information maintained by the second computing device. In some embodiments, the first computing device receives, from the second computing device, contact information (e.g., contact information 202) about a user of the second computing device and determines whether to establish the secure wireless connection based on a comparison of the contact information with contact information maintained by the first computing device.

In step 410, the first computing device determines whether an application (e.g., application 120) of the first computing device is presenting an authentication prompt (e.g., authentication prompt 122) to a user. In some embodiments, the first computing device receives, from the second computing device, metadata (e.g., credential metadata 302) about the user credential, and the first computing device uses the metadata to determine whether the user credential is relevant to the authentication prompt presented to the user. In some embodiments, the first computing device sends metadata (e.g., via credential request 222) about the authentication prompt to the second computing device, and the second computing device is configured to use the metadata to determine whether the credential manager includes a user credential relevant to the authentication prompt.

In step 415, in response to determining that the authentication prompt is being presented, the first computing device populates one or more fields of the authentication prompt with the user credential. In some embodiments, the first computing device is configured to store the received user credential in a credential manager (e.g., credential manager 110B) maintained by first computing device in response to determining that an authentication prompt is not being presented to the user.

Turning now to FIG. 4B, a flow diagram of another method 430 for sharing a credential is depicted. In some embodiments, method 430 is performed by a first computing device, such as mobile device 100A, sending a credential to a second computing device. In some embodiments, steps may be performed concurrently or in a different order than shown.

Method 430 begins in step 435 with maintaining a credential manager (e.g., credential manager 110A) that stores a plurality of user credentials (e.g., credentials 112) usable to authenticate a user. In step 440, the first computing device receives a request (e.g., via request button 304) from the user to send one of the plurality of user credentials to a second computing device (e.g., mobile device 100B). In step 445, the first computing device sends, in response to the request, the user credential to the second computing device. In various embodiments, the second computing device is configured to determine whether an application (e.g., application 120) of the second computing device is presenting an authentication prompt (e.g., authentication prompt 122) to a user and, in response to determining that the authentication prompt is being presented, populate one or more fields of the authentication prompt with the user credential. In various embodiments, the second computing device is configured to store the user credential in a credential manager (e.g., credential manager 110B) maintained by the second computing device in response to determining that an authentication prompt is not being presented.

Exemplary Computer System

Figure 5:
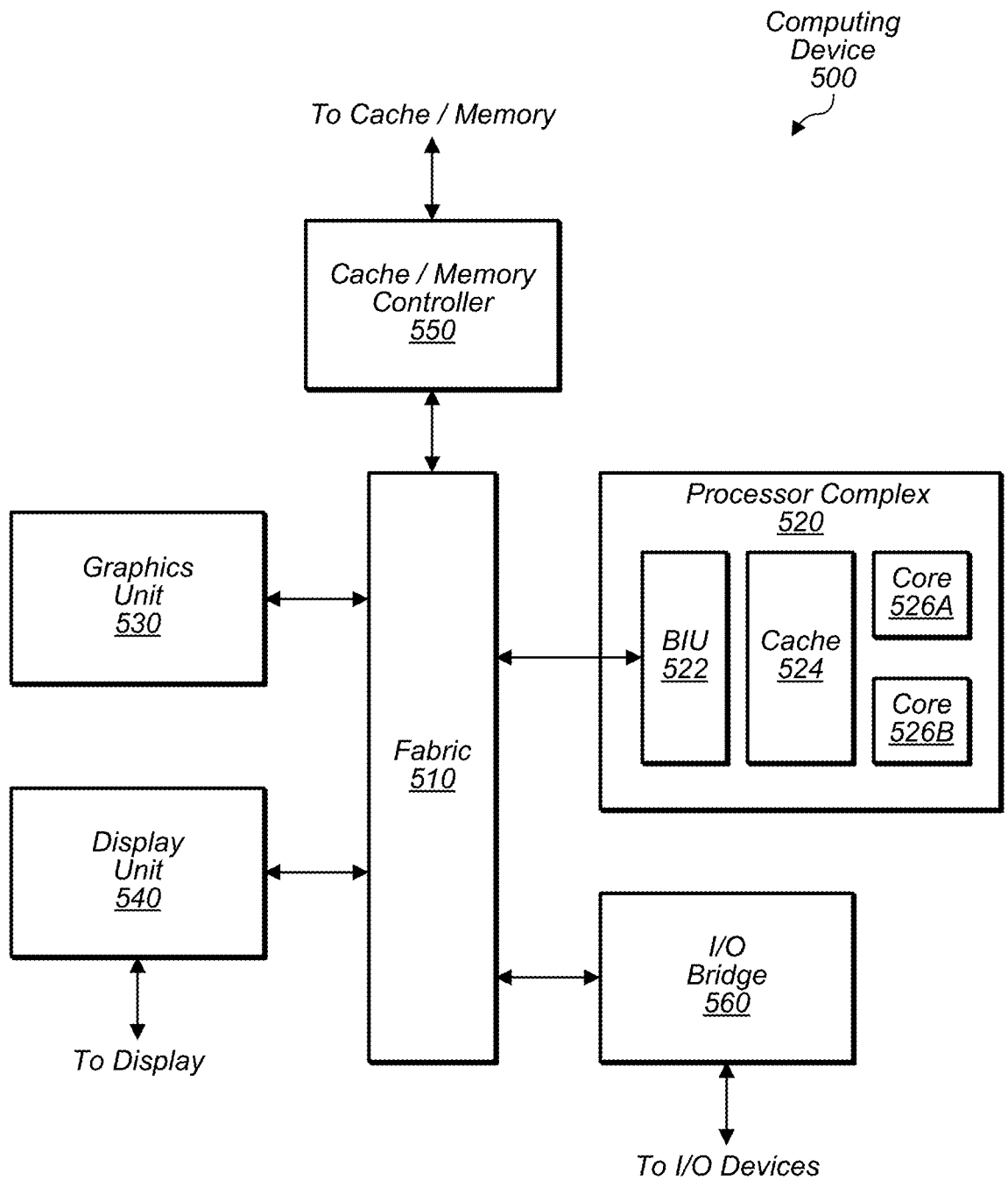
FIG. 5 is a block diagram illustrating one embodiment of an exemplary computer system.

Turning now to FIG. 5, a block diagram illustrating an exemplary embodiment of a computing device 500, which may implement functionality of mobile devices 100, is shown. Device 500 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 500 includes fabric 510, processor complex 520, graphics unit 530, display unit 540, cache/memory controller 550, input/output (I/O) bridge 560. In some embodiments, elements of device 500 may be included within a system on a chip (SOC).

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions and user application instructions such as instructions for elements 110, 120 and 210. These instructions may be stored in computer readable medium such as a memory coupled to memory controller 550 discussed below.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 520 to cause device 500 to perform functionality described herein.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., Wi-Fi™, Bluetooth™, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to improve the delivery to users of invitational content or any other content that may be of interest to them. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A non-transitory computer readable medium having program instructions stored therein having program instructions that are executable by a first computing device to perform operations comprising:
   receiving a user credential via a wireless interface from a credential manager maintained by a second computing device in response to a user selection by a user of the second computing device;
   in response to receiving the user credential, determining whether an application of the first computing device is presenting an authentication prompt to a user of the first computing device;
   in response to determining that the authentication prompt is not being presented, storing the received user credential in a credential manager maintained by the first computing device; and
   in response to determining that the authentication prompt is being presented to the user of the first computing device, providing the received user credential to authenticate the user of the first computing device.

2. The computer readable medium of claim 1, wherein the operations further comprise:
   in response to determining that an authentication prompt is being presented to the user of the first computing device, populating one or more fields of the presented authentication prompt with the user credential.

3. The computer readable medium of claim 1, wherein the operations further comprise:
   receiving, from the second computing device, a request to convey the user credential to the first computing device; and
   establishing a secure wireless connection with the second computing device to receive the user credential.

4. The computer readable medium of claim 3, wherein the secure wireless connection is an ad-hoc wireless connection.

5. The computer readable medium of claim 3, wherein the establishing includes:
   sending a public key of the first computing device to the second computing device; and
   establishing a shared key with the second computing device based on a public key received from the second computing device and a private key corresponding to the sent public key; and
   wherein the received user credential is encrypted by the public key of the first computing device and encrypted by the shared key.

6. The computer readable medium of claim 3, wherein the operations further comprise:
sending, to the second computing device, contact information about the user of the first computing device, wherein the second computing device is configured to determine whether to establish the secure wireless connection based on a comparison of the contact information with contact information maintained by the second computing device.

7. The computer readable medium of claim 3, wherein the operations further comprise:
receiving, from the second computing device, contact information about the user of the second computing device; and
determining whether to establish the secure wireless connection based on a comparison of the contact information with contact information maintained by the first computing device.

8. The computer readable medium of claim 1, wherein the operations further comprise:
receiving, from the second computing device, metadata about the user credential; and
using the metadata to determine whether the user credential is relevant to an authentication prompt presented to the user of the first computing device.

9. The computer readable medium of claim 1, wherein the operations further comprise:
sending metadata about a presented authentication prompt to the second computing device, wherein the metadata is used by the second computing device to determine whether the credential manager includes a user credential relevant to the presented authentication prompt.

10. A method, comprising:
a first computing device maintaining a credential manager that stores a plurality of user authentication credentials for authenticating a user;
the first computing device receiving a user selection from the user to send one of the plurality of user credentials to a second computing device; and
in response to the user selection, the first computing device sending the user credential via a wireless interface to the second computing device, wherein the second computing device is configured to:
determine whether an application of the second computing device is presenting an authentication prompt to a user;
in response to determining that the authentication prompt is not being presented, store the user credential in a credential manager maintained by the second computing device; and
in response to determining that the authentication prompt is being presented to the user of the second computing device, provide the received user credential to authenticate the user of the second computing device.

11. The method of claim 10, further comprising:
the first computing device sending, to the second computing device, a request to send the user credential to the second computing device; and
the first computing device establishing a secure wireless connection with the second computing device to send the user credential.

12. The method of claim 11, wherein the secure wireless connection is an ad-hoc wireless connection.

13. The method of claim 11, wherein the establishing includes:
the first computing device sending a public key of the first computing device to the second computing device; and
the first computing device establishing a shared key with the second computing device based on a public key received from the second computing device and a private key corresponding to the sent public key; and
wherein the sent user credential is encrypted by the public key of the second computing device and encrypted by the shared key.

14. The method of claim 11, further comprising:
the first computing device receiving, from the second computing device, contact information about a user of the second computing device; and
the first computing device determining whether to establish the secure wireless connection based on a comparison of the contact information with contact information maintained by the first computing device.

15. The method of claim 11, further comprising:
the first computing device sending, to the second computing device, contact information about a user of the first computing device, wherein the second computing device is configured to determine whether to establish the secure wireless connection based on a comparison of the contact information with contact information maintained by the second computing device.

16. The method of claim 10, further comprising:
the first computing device sending, to the second computing device, metadata about the user credential, wherein the second computing device is configured to use the metadata to determine whether the user credential is relevant to an authentication prompt.

17. The method of claim 10, further comprising:
the first computing device receiving metadata about a presented authentication prompt from the second computing device; and
the first computing device using the metadata to determine whether the credential manager includes a user credential relevant to the presented authentication prompt.

18. A first computing device, comprising:
a wireless interface;
a processor;
memory having program instructions stored therein that are executable by the processor to cause the first computing device to perform operations including:
receiving, via the wireless interface, a user credential from a credential manager maintained by a second computing device in response to a selection by a user of the second computing device;
determining whether an application of the first computing device is presenting an authentication prompt to a user of the first computing device;
in response to determining that the authentication prompt is being presented, providing the user credential to authenticate the user of the first computing device in response to the authentication prompt; and
in response to determining that the authentication prompt is not being presented, providing the received user credential to a credential manager of the first computing device for storage.

19. The first computing device of claim 18, wherein the receiving includes:
receiving, from the second computing device, a request to convey the user credential to the first computing device; and establishing a secure wireless connection with the second computing device to receive the user credential, wherein the secure wireless connection is an ad-hoc wireless connection.

\* \* \* \* \*